(12) United States Patent
Kim

(10) Patent No.: US 10,321,786 B2
(45) Date of Patent: Jun. 18, 2019

(54) BLENDER

(71) Applicant: NUC ELECTRONICS CO., LTD., Daegu (KR)

(72) Inventor: Jong Boo Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 0 days.

(21) Appl. No.: 15/870,604

(22) Filed: Jan. 12, 2018

(65) Prior Publication Data

US 2018/0199762 A1  Jul. 19, 2018

Related U.S. Application Data

(63) Continuation of application No. 15/594,292, filed on May 12, 2017, now Pat. No. 9,999,319.

(30) Foreign Application Priority Data

Nov. 17, 2016  (KR) .................. 10-2016-0153161

(51) Int. Cl.
*A47J 43/00* (2006.01)
*A47J 43/07* (2006.01)
*A47J 43/046* (2006.01)

(52) U.S. Cl.
CPC ......... *A47J 43/0716* (2013.01); *A47J 43/046* (2013.01)

(58) Field of Classification Search
CPC ..................... A47J 43/046; A47J 43/0716
USPC ............... 241/92, 281.1, 281.2; 181/198
See application file for complete search history.

(56) References Cited

U.S. PATENT DOCUMENTS

| | | | |
|---|---|---|---|
| 3,747,735 | A | 7/1973 | Frick |
| 3,960,237 | A | 6/1976 | Sleeper |
| 4,892,413 | A | 1/1990 | Vats |
| 5,432,306 | A | 7/1995 | Pfordresher |
| 5,696,358 | A | 12/1997 | Pfordresher |
| 5,957,577 | A | 9/1999 | Dickson et al. |
| 7,520,663 | B1 | 4/2009 | Kolar et al. |
| 7,549,505 | B1 | 6/2009 | Kawar |
| 7,972,087 | B2 | 7/2011 | Davison |
| 8,087,603 | B2 | 1/2012 | Kolar et al. |

(Continued)

FOREIGN PATENT DOCUMENTS

| | | |
|---|---|---|
| CN | 201320105 Y | 10/2009 |
| CN | 102631153 A | 8/2012 |

(Continued)

OTHER PUBLICATIONS

Extended European Search Report, dated Dec. 18, 2017, for European Application No. 17170713.6-1656, 10 pages.

*Primary Examiner* — Faye Francis
(74) *Attorney, Agent, or Firm* — Seed IP Law Group LLP

(57) ABSTRACT

In order to provide a processor in which a reception space occupied by a body thereof may be decreased when it is not used, a container may be mounted on and detached from the body without being hindered, visibility of an inner portion of the container may be improved, and noise generated at the time of an operation may be decreased, a soundproofing cover is mounted on the body so as to cover the container, is detachable from the body to be completely separated from the body, and has an internal space closed by closure of an opening of one end thereof by the body. One end portion of a first vacuum tube is disposed to be exposed to an upper surface of the body and is connected to one end portion of a second vacuum tube.

5 Claims, 15 Drawing Sheets

(56) References Cited

U.S. PATENT DOCUMENTS

| | | |
|---|---|---|
| 8,287,180 B2 | 10/2012 | Kolar et al. |
| RE45,308 E | 12/2014 | Kolar et al. |
| RE45,655 E | 8/2015 | Kolar et al. |
| 2003/0034200 A1 | 2/2003 | Bohannon et al. |
| 2005/0034767 A1 | 2/2005 | Reimer et al. |
| 2009/0114475 A1 | 5/2009 | Eilers |
| 2011/0001369 A1 | 1/2011 | LeBaron, Jr. |
| 2014/0059724 A1 | 2/2014 | Iyoki et al. |
| 2014/0137750 A1 | 5/2014 | Arai et al. |
| 2016/0120369 A1 | 5/2016 | Zils et al. |
| 2017/0086622 A1 | 3/2017 | Chung |

FOREIGN PATENT DOCUMENTS

| | | |
|---|---|---|
| JP | 2015-119868 A | 7/2015 |
| KR | 10-2011-0044904 A | 5/2011 |
| KR | 10-2015-0125168 A | 11/2015 |
| KR | 10-1618729 B1 | 5/2016 |

BLENDER

CROSS-REFERENCE TO RELATED APPLICATIONS

This application is a continuation of pending U.S. patent application Ser. No. 15/594,292, filed May 12, 2017, which claims priority from and the benefit of Korean Patent Application No. 10-2016-0153161, filed on Nov. 17, 2016, which is hereby incorporated by reference for all purposes as if fully set forth herein.

BACKGROUND

Technical Field

The present disclosure relates to a blender, and more particularly, to a vacuum blender in which noise generated when a food material is processed in a container of the blender may be decreased and convenience of the use is improved.

Description of the Related Art

Generally, a blender, which allows a food material such as a fruit, a vegetable, or the like, to be put in a container having a processing blade rotatably mounted in an inner side of a lower portion thereof to be subjected to processing procedures such as blending, pulverizing, and the like, by putting the food material into the container, covering the container with a cover, and then providing power of a driving device mounted outside the container to the processing blade, may rapidly prepare juice, soup, and the like, in busy modern society. Therefore, a demand for the blender has increased.

In addition, there is a trend to variously develop a vacuum blender exhausting air in the container so that the food material processed in the container of the blender as described above may be processed in a fresh state. Since the vacuum blender as described above may process the food material while maintaining an inner portion of the container in a decompression state (a low oxygen concentration), it may suppress browning, oxidation, destruction of nutrients, and the like, of the food material, and may also suppress a large amount of air bubbles from being generated in the processed food material to improve texture or visual representation of the processed food material.

An example of the vacuum blender according to the related art as described above is disclosed in Korean Patent No. 10-1618729, and will be briefly described with reference to FIG. 1.

As illustrated in FIG. 1, the vacuum blender 100 according to the related art includes a body 210 accommodating a motor 240 and a vacuum pump 230 therein and provided with a manipulating part 200 having manipulating buttons 220 disposed on a surface thereof; a vacuum pulverizing part 500 detachably seated on the body 210 and including a storing container 510 including a mixer blade 515 rotatably mounted on a bottom portion of an inner portion thereof; a support part 300 extended upwardly of the body 210 along a sidewall of the vacuum pulverizing part 500; and a vacuum decompressing part 400 rotatably connected to an upper end of the support part 300 and connected to an upper end of the storing container 510 so as to be in communication with the upper end of the storing container 510.

However, in the vacuum blender 100 according to the related art as described above, the support part 300 is formed integrally with the body 210 so as to protrude upwardly, such that the vacuum blender 100 has a high height even in a state in which the storing container 510 is removed from the body 210 to occupy a large reception space. In addition, the support part 300 is formed along one side of the storing container 510, such that the support part 300 becomes an obstacle when a user approaches the body 210 in order to remove or mount the storing container 510, which causes inconvenience of the use. In addition, at any position, a case in which an inner portion of the storing container 510 may not be viewed due to the support part 300 hiding the storing container 510 occurs, such that it may be difficult to figure out a processed state of the food material.

In addition, the vacuum decompressing part 400 in which a first vacuum room 450 that may be in communication with an exhaust hole formed in a sealing cover 530 connected to an upper side of the storing container 510 is formed is rotatably connected to an upper portion of the support part 300. However, since the vacuum decompressing part 400 configured as described above is supported from a lower side thereof or is connected to the storing container 510 by the sealing cover 530 disposed at the upper end of the storing container 510, in the case in which the storing container 510 is not present, a support element is not present therebelow, such that the vacuum decompressing part 400 excessively rotates downwardly. Therefore, large stress is generated in a hinge part 310, or the like, such that a fracture, or the like, may be generated.

In addition, when the storing container 510 is operably seated on the body 210, driving force of the motor 240 in the body 210 is transferred to a rotation base 250, a rotation plate 512 connected to the rotation base 250 by friction or ruggedness coupling, or the like, and a rotation shaft 514 rotated and supported by a lower packing 517 and a bearing 516. Therefore, the mixer blade 515 connected to an end portion of the rotation shaft 514 may rotate in the storing container 510.

However, since mechanical friction between components is significantly generated in a driving force transfer mechanism through which the driving force of the motor 240 is transferred to the mixer blade 515 in the storing container 510, noise large enough to make a user or the surrounding persons inconvenient may be generated during an operation of the vacuum blender 100.

In addition, when the mixer blade 515 in the storing container 510 pulverizes the food material, large noise is also generated due to friction and collision between the mixer blade 515 and the food material, and air of the first vacuum room 450 and a second vacuum room 580 is exhausted by an operation of the vacuum pump 230, large noise is also generated due to friction, or the like, between the air passing through a second vacuum closure 540, a connection nozzle 440, and the like, and the second vacuum closure 540, the connection nozzle 440, and the like.

BRIEF SUMMARY

Therefore, embodiments of the present invention are suggested in order to solve the problems of the vacuum blender according to the related art as described above, and embodiments provide a blender in which a reception space occupied by a body of the blender may be decreased when the blender is not used, a container may be mounted on and detached from the body even at any place of a circumference of the body without being hindered, visibility of an inner portion of the container may be improved, and noise generated at the time of an operation may be decreased.

According to an aspect of the present invention, there is provided a blender including: a body including a motor providing driving force and a vacuum pump sucking air; a container detachably mounted on the body and including a processing member rotatably mounted at an inner portion of a lower side thereof and a container cover air-tightly mounted in an upper opening thereof; a first vacuum tube connected to the vacuum pump; and a soundproofing cover mounted on the body so as to cover the container, detachable from the body to be completely separated from the body, and having an internal space closed by closure of an opening of one end thereof by the body when the soundproofing cover is mounted on the body, wherein one end portion of the first vacuum tube is exposed to the internal space when the soundproofing cover is mounted on the body.

An exhaust hole allowing an inner portion of the container and the internal space of the soundproofing cover to be in communication with each other may be formed in the container or the container cover.

A check valve permitting air in the container to be exhausted and blocking external air from being introduced may be provided in the exhaust hole.

The blender may further include a second vacuum tube of which one end portion is connected to the one end portion of the first vacuum tube and the other end portion is disposed in the vicinity of the exhaust hole, when the soundproofing cover is mounted on the body.

The blender may further include a contact part provided at the other end portion of the second vacuum tube and contacting the exhaust hole so as to be closely adhered to the exhaust hole.

The blender may further include an adsorption member provided at the other end portion of the second vacuum tube and contacting the exhaust hole so as to be closely adhered to the exhaust hole.

The second vacuum tube may be coupled to the soundproofing cover, and be detachable together with the soundproofing cover from the body.

The second vacuum tube may be formed by a double wall of the soundproofing cover.

The one end portion of the first vacuum tube may be provided with an adsorption member.

A seating part may be formed to protrude on the body, the container may be mounted on the seating part, a position determining part protruding inwardly of the soundproofing cover may be provided at an inner side of a lower end of the soundproofing cover, the position determining part may have a first inclined surface inclined inwardly toward an upward direction, an edge of the seating part may have a second inclined surface corresponding to the first inclined surface, and the adsorption member may be disposed on the second inclined surface.

The number of one end portions of the second vacuum tube disposed at a lower end of the soundproofing cover may be plural.

The blender may further include a blocking part formed on the body so as to correspond to the one end portions of the second vacuum tube that are not connected to the one end portion of the first vacuum tube among the plurality of one end portions of the second vacuum tube and blocking external air from being sucked.

A seating part may be formed to protrude on the body, the container may be mounted on the seating part, and a position determining part protruding inwardly of the soundproofing cover may be provided at an inner side of a lower end of the soundproofing cover.

The position determining part may have a first inclined surface inclined inwardly toward an upward direction, and an edge of the seating part may have a second inclined surface corresponding to the first inclined surface.

The soundproofing cover may further include a knob disposed on a sidewall thereof, and the second vacuum tube may be disposed through the knob.

The contact part may vertically move.

An upper wall of the soundproofing cover may be opened or closed.

The container may include an auxiliary injection part, and an opening allowing the auxiliary injection part to be exposed to the outside may be formed in the soundproofing cover.

The container may include a discharging part permitting a content in the container to be discharged to the outside, and a cutout part may be formed in the soundproofing cover so that the discharging part protrudes outwardly of the soundproofing cover.

The blender may further include a compressing member disposed adjacently to a contact portion between the soundproofing cover and the body to maintain air-tightness between the soundproofing cover and the body and formed of an elastic material.

The blender may further include a release valve releasing a vacuum state of the internal space of the soundproofing cover.

According to another aspect of the present invention, there is provided a blender including: a body including a motor providing driving force and a vacuum pump sucking air; a container detachably mounted on the body and including a processing member rotatably mounted at an inner portion of a lower side thereof and a container cover air-tightly mounted in an upper opening thereof; a first vacuum tube connected to the vacuum pump; a soundproofing cover mounted on the body so as to cover the container, detachable from the body to be completely separated from the body, and having an internal space closed by closure of an opening of one end thereof by the body when the soundproofing cover is mounted on the body, one end portion of the first vacuum tube being exposed to the outside of the internal space of the soundproofing cover when the soundproofing cover is mounted on the body; and a second vacuum tube of which one end portion is connected to the one end portion of the first vacuum tube and the other end portion is disposed in the vicinity of an exhaust hole, when the soundproofing cover is mounted on the body.

DETAILED DESCRIPTION

Hereinafter, exemplary embodiments of the present invention will be described with reference to the accompanying drawings. Exemplary embodiments described herein are not to be interpreted as limiting the present invention, and are to be understood as only examples.

Figure 1:
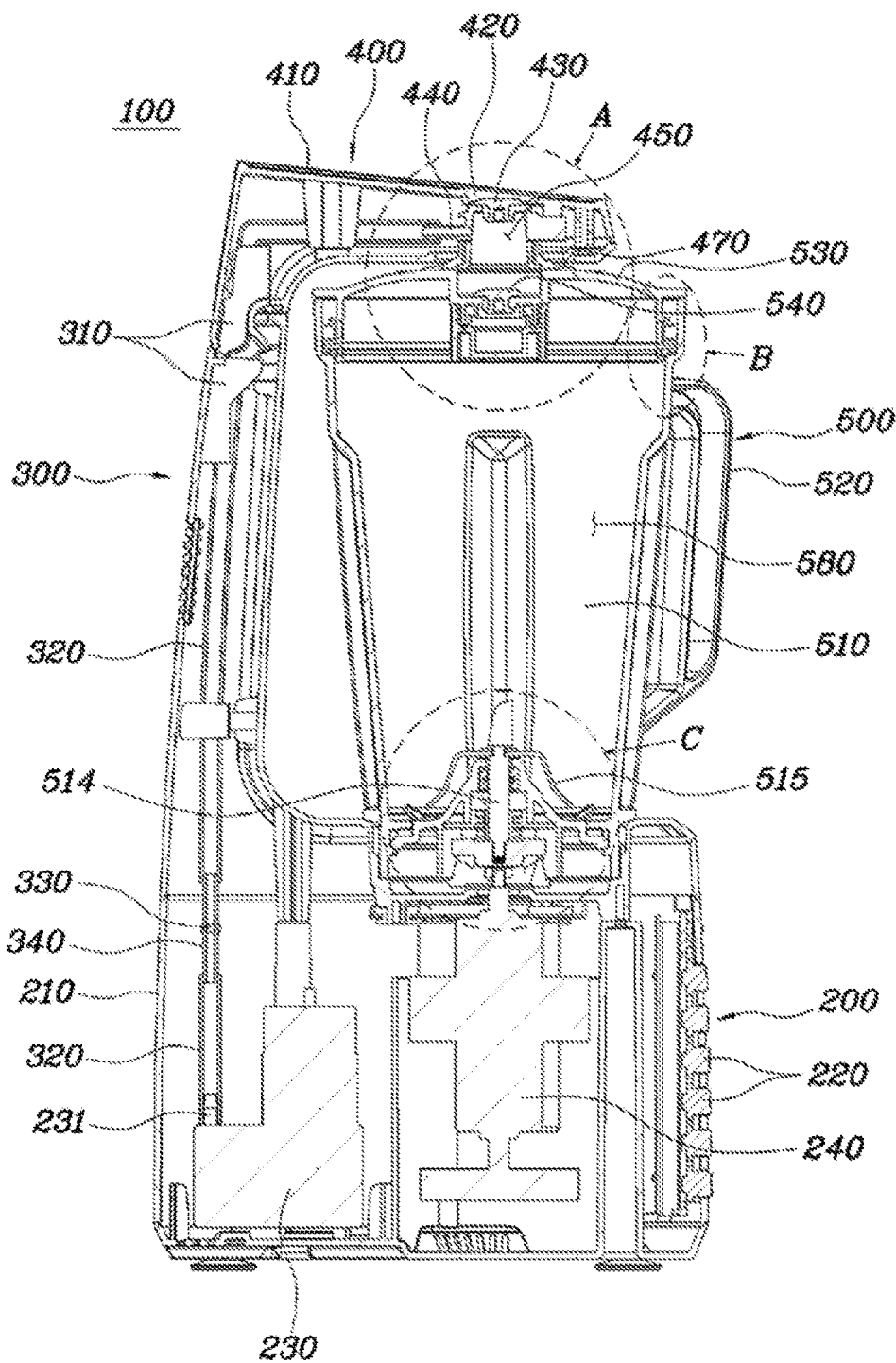
FIG. 1 is a side cross-sectional view of a vacuum blender according to the related art.
Figure 1A:
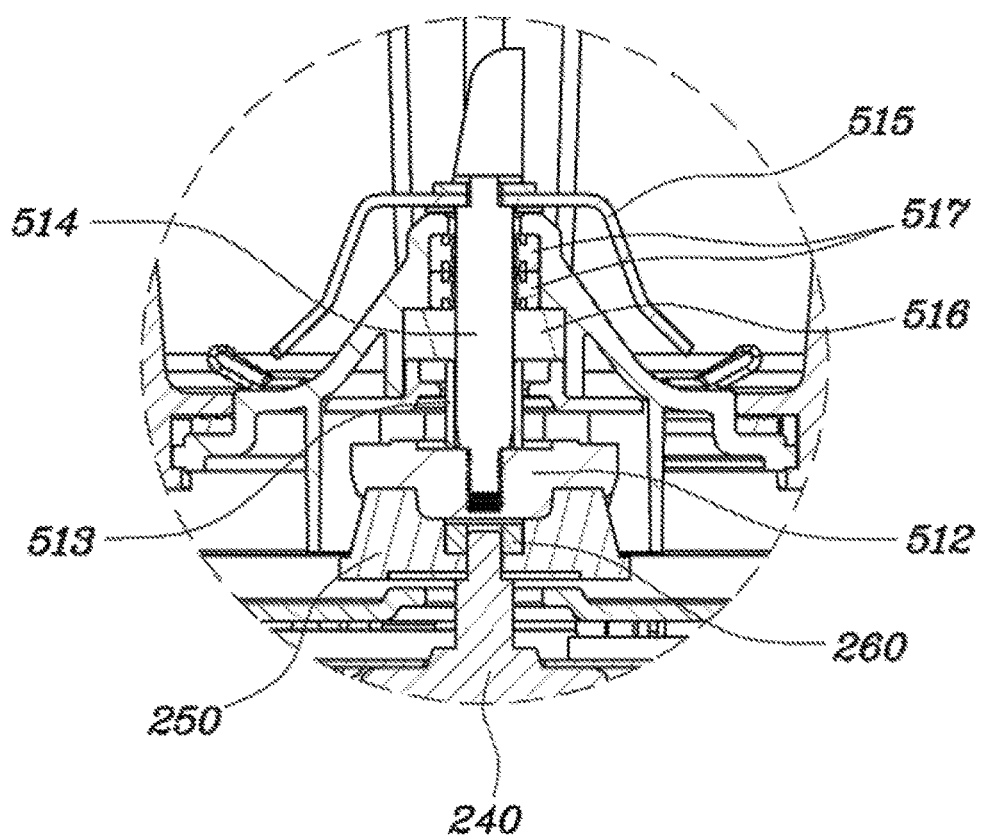
FIG. 1A is an enlarged detail view of a portion of the vacuum blender of FIG. 1.
Figure 2:
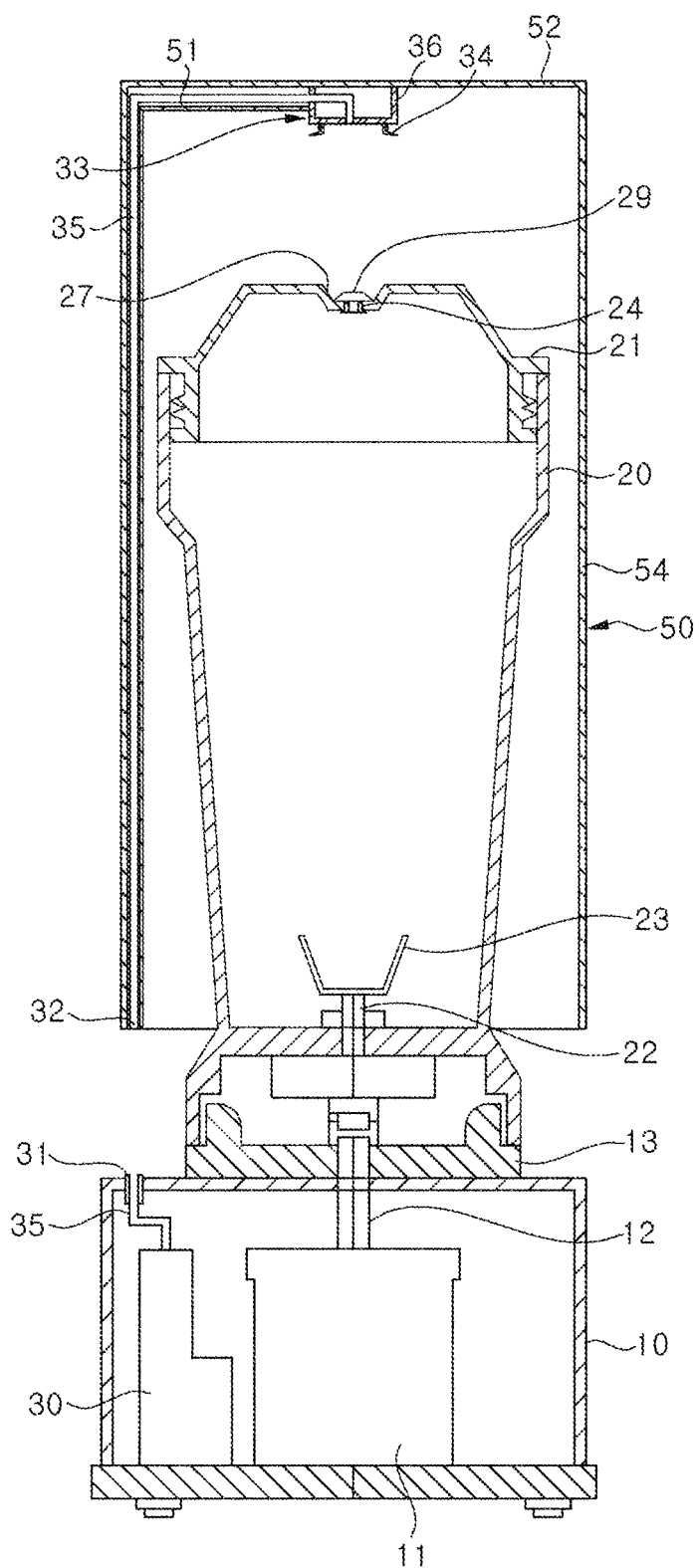
FIG. 2 is a schematic side cross-sectional view illustrating a disassembled state of a vacuum blender according to an exemplary embodiment of the present invention.
Figure 3:
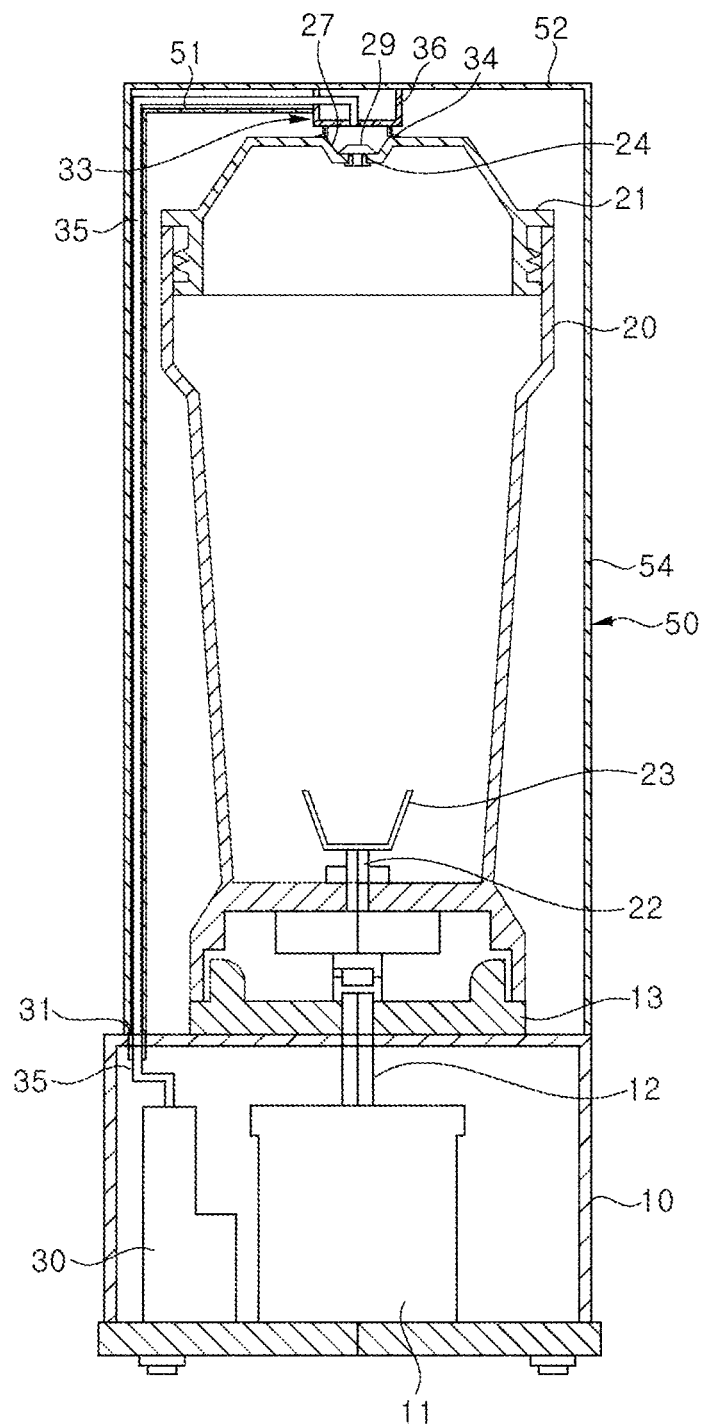
FIG. 3 is a schematic side cross-sectional view illustrating an assembled state of the vacuum blender of FIG. 2.

Referring to FIGS. 2 and 3, a schematic side cross-sectional view of a vacuum blender according to an exemplary embodiment of the present invention is illustrated.

The vacuum blender according to an exemplary embodiment of the present invention includes a body 10 in which a motor 11 providing driving force and a vacuum pump 30 that may suck air are accommodated; and a soundproofing cover 50 accommodating a container 20 therein and detachably connected to the body 10.

The vacuum blender is described in the present exemplary embodiment. However, the present invention is not necessarily limited to being applied to the vacuum blender, but may also be applied to a general blender. In addition, the container 20 may be removably seated in the body 10, and may include a processing member such as a mixer blade 23 rotatably disposed at a lower portion of an inner side thereof in order to process a food material. A container cover 21 may be air-tightly and detachably connected to an upper opening of the container 20. In addition, a seating part 13 assisting the container 20 to be seated and having a driving force transfer mechanism disposed thereon in order to transfer the driving force of the motor 11 to the mixer blade 23 of the container 20 may be formed on the body 10.

An operating part (not illustrated) is present in the body 10. Therefore, a user may operate the vacuum blender as needed by manipulating buttons, and the like, of the operating part. An operation of the motor 11 or the vacuum pump 30 may be adjusted by the manipulation of the operating part by the user.

The motor 11 provides the driving force that may rotate the mixer blade 23 of the container, a shaft 12 of the motor 11 may be provided at an upper side of the body 10 and be connected to a rotation base (not illustrated) constituting the driving force transfer mechanism, and the rotation base may be provided at an outer side of a lower portion of the container 20 and be connected to a rotation plate (not illustrated) constituting the driving force transfer mechanism. The rotation plate is connected to a rotation shaft 22, and the processing member such as the mixer blade 23 is connected to an end portion of the rotation shaft 22 of an inner side of the container 20.

The vacuum pump 30, which is to suck the air, may have a vacuum tube (a first vacuum tube (or channel)) 35 extended from a suction port (not illustrated) thereof. The vacuum pump 30 may receive the driving force from the motor 11, but may also include a separate driving device. One end portion 31 of the vacuum tube 35 connected to the suction port of the vacuum pump 30 may be disposed to be exposed to, for example, an upper surface of the body 10. When a soundproofing cover 50 to be described below is mounted on the body 10, one end portion 31 of the vacuum tube 35 exposed as described above may be connected to one end portion 32 of a vacuum tube (a second vacuum tube) 35 provided to be exposed to a lower end of the soundproofing cover 50. Therefore, suction force of the vacuum pump 30 may be transferred to an exhaust hole 24 of the container cover 21 closely adhered to a contact part 33 through the vacuum tube 35 to suck air in the container 20. The vacuum pump 30 is provided with an exhaust port (not illustrated) for exhausting the air sucked as described above. In addition, the exhaust hole is formed in the container cover of the container 20 in the present exemplary embodiment, but is not limited thereto. That is, the exhaust hole may also be formed in any one portion of the container 20 itself.

The vacuum pump 30 may be maintained in a vacuum state for a predetermined period after it is operated, but may also be configured so that a vacuum state is substantially released when an operation of the vacuum pump 30 ends.

The seating part 13 to which a lower portion of the container 20 is detachably connected may be formed on the body 10. The rotation base connected to the shaft of the motor 11 may be provided on the seating part 13 so as to be exposed.

The container 20 may include the mixer blade 23 as the processing member rotatably mounted at the lower portion of the inner side thereof, and the mixer blade 23 may receive the driving force from the motor 11 as described above through the rotation shaft 22. The container 20 may be formed of a transparent material such as tempered glass, such that an inner portion of the container 20 may be viewed by the user.

The upper opening of the container 20 is provided with the container cover 21 air-tightly and detachably connected to the upper opening of the container 20. The exhaust hole 24 that may be in communication with a contact part 33 of a soundproofing cover 50 to be described below may be formed in the container cover 21. A concave part 27 may be formed in the vicinity of the exhaust hole 24 to improve maintenance of air-tightness at the time of closely adhering the exhaust hole 24 to a contact part 33 to be described below. The exhaust hole 24 may be provided with a kind of check valve 29 only exhausting air and blocking air from being introduced into the container 20.

The soundproofing cover 50 may be detachably mounted on the body 10 so as to cover the container 20 and the container cover 21 from an upper side of the container 20. The soundproofing cover 50 may be formed in, for example, a cylindrical shape of which an upper end portion is closed.

The vacuum tube (the second vacuum tube) 35 extended from the lower end of the soundproofing cover 50 to the contact part 33 may be disposed in a sidewall 54 of the soundproofing cover 50. The vacuum tube 35 provided in the soundproofing cover 50 may be a separate tube, but may also be formed by a double wall by dualizing a portion of the sidewall 54 of the soundproofing cover 50, that is, forming an inner wall 51.

An upper wall 52 of the soundproofing cover 50 may be provided with the contact part 33 for being connected to the exhaust hole 24 of the container cover 21 when the soundproofing cover 50 is mounted on the body 10. The other end portion of the second vacuum tube 35 may be opened to a lower side of the contact part 33. The contact part 33 may be provided with a protrusion body 36 protruding on a lower side of the upper wall 52 and an adsorption member 34 disposed on a lower side of the protrusion body. The other end portion of the second vacuum tube 35 may be exposed to a central portion of the adsorption member 34.

The adsorption member 34 for improving air-tightness of connection between the contact part 33 and the container cover 21 may also be provided on a lower surface of the contact part 33 (see FIG. 3). In this case, the adsorption member 34 may cooperate with the concave part 27 formed in the vicinity of the exhaust hole 24 of the container cover 21 to further improve the air-tightness.

Meanwhile, one end portion of the vacuum pump 35 connected to the vacuum pump 30 may be exposed to the outside of the upper surface of the body 10 covered by the soundproofing cover 50, that is, the outside of an internal space of the soundproofing cover 50, when the soundproofing cover 50 is mounted on the body. In this case, the vacuum tube 35 disposed in the soundproofing cover 50 may also be a separate pipe member, or the like, provided on an outer surface of the soundproofing cover 50.

As described above, when the soundproofing cover 50 is mounted on, for example, the body 10, the suction force of the vacuum pump 30 is transferred to the contact part 33 through the vacuum tube 35 and is transferred from the contact part 33 into the container 20 through the exhaust hole 24 of the container cover 21, such that the air in the container 20 may be exhausted. Therefore, a density of oxygen in the container 20 may be decreased to obtain effects such as suppression of a change in a color, suppression of oxidation, a decrease in destruction of nutrients, a decrease in generation of air bubbles, and the like, of a food material processed by the member processing the food material in the container 20, such as the mixer blade 23. In addition, in this case, the air exhausted from the container 20 may generate noise while passing through the valve 29, and the like, but propagation of the noise to the outside may be suppressed by the soundproofing cover 50.

In addition, when the soundproofing cover 50 is mounted on, for example, the body 10, the soundproofing cover 50 also covers the seating part 13 provided on the body 10. Therefore, mechanical noise generated in the driving force transfer mechanism for transferring the driving force of the motor 11 to the mixer blade 23 of the container 20 and noise generated due to collision between the mixer blade 23 and the food material, or the like, may be suppressed from being diffused to the outside, such that inconvenience of the user and the surrounding persons due to the noise may be decreased.

Alternatively, air of an internal space formed by the soundproofing cover 50 and the body 10 is configured to be exhausted by the vacuum pump 30 (for example, the adsorption member 34 of the contact part 33 is removed or as described below, the first vacuum tube (or channel) connected to the suction port of the vacuum pump 30 is in communication with the upper surface of the body 10 covered by the soundproofing cover 50 (see FIG. 15)), thereby making it possible to further improve a noise blocking effect. That is, since noise such as a mechanical friction sound is transferred using air as a medium, when a density of the air is lowered by exhausting the air in the soundproofing cover 50, a noise transfer may be decreased.

In addition, since the soundproofing cover 50 may be easily completely removed from the body 10, a process of mounting the container 20 on the body 10 or removing the container 20 from the body 10 may be performed even at any place of an entire circumference of the vacuum blender. In addition, in the case in which the vacuum blender is not used, the soundproofing cover 50 is completely removed, such that a space required for receiving the body 10 may be decreased.

In addition, when the soundproofing cover 50 is removed from the body 10, a release valve (not illustrated) for releasing a vacuum state in the soundproofing cover 50 may be provided in, for example, the body. For example, the release valve may be disposed in the vacuum tube 35 between an inlet port of the vacuum pump 30 and one end portion 31 of the vacuum tube 35 to allow external air to be introduced into the soundproofing cover 50 at the time of releasing the vacuum state.

In addition, the soundproofing cover 50 may be formed of a material having transparency, similar to the container 20. In this case, the user may observe the inner portion of the container 20 from an entire circumference of the container 20, and convenience of the use may be improved.

Figure 4:
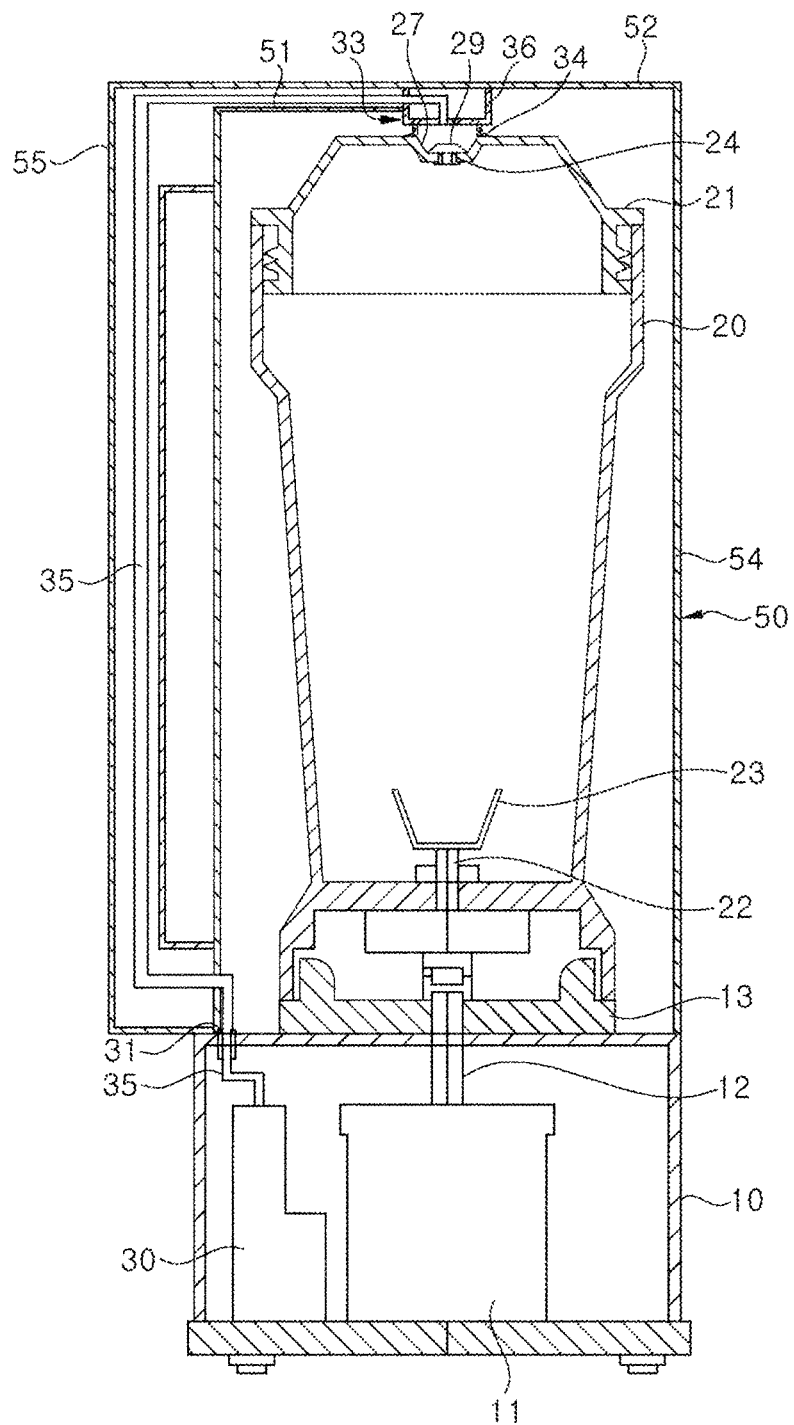
FIG. 4 is a schematic side cross-sectional view illustrating a vacuum blender according to another exemplary embodiment of the present invention.

Referring to FIG. 4, a schematic side cross-sectional view of a vacuum blender according to another exemplary embodiment of the present invention is illustrated.

The vacuum blender according to another exemplary embodiment of the present invention illustrated in FIG. 4 is different from the vacuum blender according to an exemplary embodiment of the present invention illustrated in FIGS. 2 and 3 in that the soundproofing cover 50 has a knob 55. The knob 55 may be disposed on, for example, the sidewall 54 of the soundproofing cover 50. For example, as illustrated in FIG. 4, the knob 55 may be disposed in parallel with a longitudinal direction of the sidewall 54.

In addition, the vacuum tube 35 may be extended through the knob 55. In this case, since the knob 55 has a relatively large thickness, the vacuum tube 35 may be easily buried in the knob 55. The vacuum tube 35 may include a separate pipe member, but may also include a channel formed in the knob 55.

Figure 5:
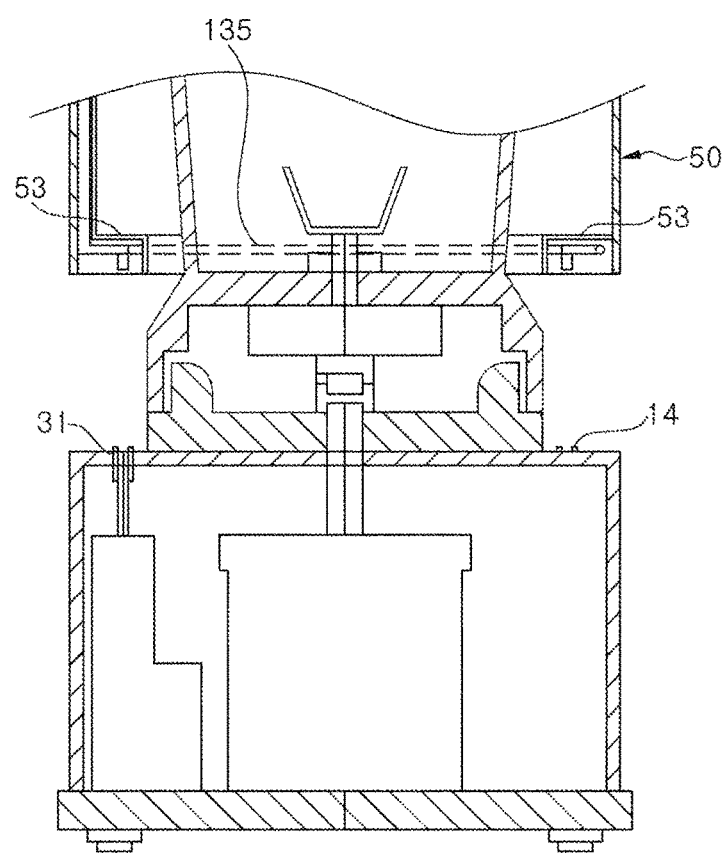
FIG. 5 is a partial side cross-sectional view illustrating a connection part in a disassembled state of a vacuum blender according to still another exemplary embodiment of the present invention.

Referring to FIG. 5, a schematic side cross-sectional view of a connection part through which a lower end of a soundproofing cover 50 and a body 10 of a vacuum blender according to still another exemplary embodiment of the present invention are connected to each other is illustrated.

The vacuum blender according to still another exemplary embodiment of the present invention illustrated in FIG. 5 is different from the vacuum blender according to an exemplary embodiment of the present invention illustrated in FIGS. 2 and 3 in that it includes a position determining part 53 that may prevent a position of the soundproofing cover 50 mounted on the body 10 from being changed in a lateral direction on the upper surface of the body 10. That is, the position determining part 53 further protruding inwardly as compared with a width or an inner diameter of the soundproofing cover 50 to be closely adhered to the seating part 13 when the soundproofing cover 50 is mounted on the body 10 is formed at an inner side of a lower end of the soundproofing cover 50. The position determining part 53 may be formed in, for example, an annular shape, but intermittently, the number of position determining parts 53 may be two or more or only one.

According to the configuration as described above, since the position determining part 53 may maintain the position of the soundproofing cover 50 on a plane, a connection state between one end portion 31 of the vacuum tube 35 connected to the vacuum pump 30 and one end portion 32 of the vacuum tube 35 provided in the soundproofing cover 50 and positioned at the lower end of the soundproofing cover 50 may be reliably maintained.

In addition, the vacuum blender according to still another exemplary embodiment of the present invention illustrated in FIG. 5 may also include a plurality of end portions of the vacuum tube 35 disposed at the lower end of the soundproofing cover 50. In this case, the plurality of one end portions of the vacuum tube 35 may be connected to the vacuum tube 35 and to each other through a connection pipe 135. Therefore, since the user has only to connect any one of the plurality of one end portions of the vacuum tube 35 to one end portion 31 of the vacuum tube 35 of the body 10, the soundproofing cover 50 may be more easily and rapidly mounted. In addition, the plurality of end portions of the vacuum tube 35 that are not connected may be closed by a blocking part 14 provided on the body 10, but may also be used to exhaust the air in the soundproofing cover 50 without being closed.

Figure 6:
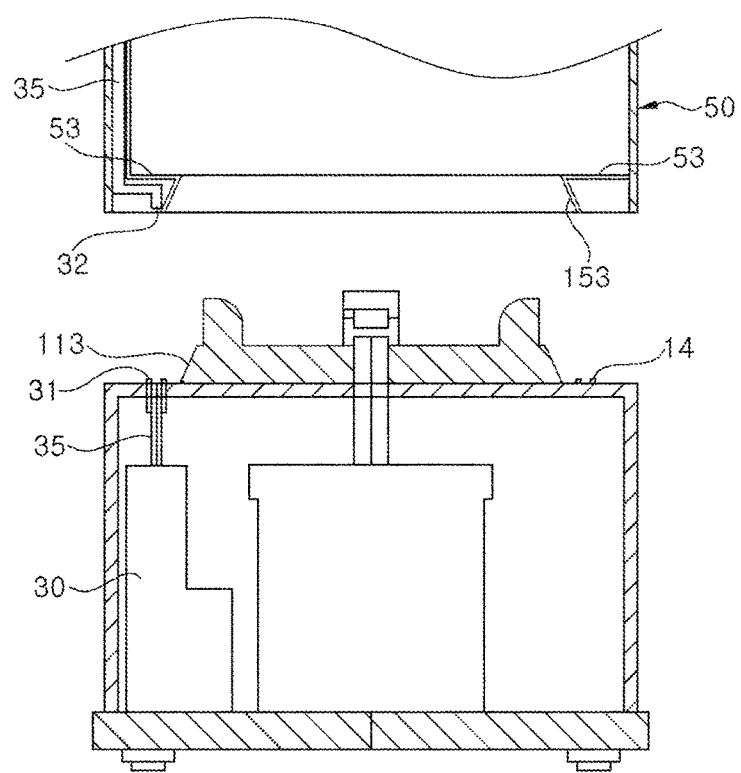
FIG. 6 is a partial side cross-sectional view illustrating a connection part in a disassembled state of a vacuum blender according to yet still another exemplary embodiment of the present invention.

Referring to FIG. 6, a schematic side cross-sectional view of a connection part through which a soundproofing cover and a body of a vacuum blender according to yet still another exemplary embodiment of the present invention are connected to each other is illustrated.

The vacuum blender according to yet still another exemplary embodiment of the present invention illustrated in FIG. 6 is different from the vacuum blender according to still another exemplary embodiment of the present invention illustrated in FIG. 5 in that the position determining part 53 has a first inclined surface 153 inclined inwardly toward an upward direction and an edge of the seating part 13 has a second inclined surface 113 corresponding to the first inclined surface 153 of the position determining part 53.

According to the configuration as described above, when the soundproofing cover 50 is mounted on the body 10, since a width or a diameter of a lower side of the position determining part 53 is large and a width, but a diameter of an upper side of the seating part 13 is small, the seating part 13 may be easily inserted into the position determining part 53, such that connection of the soundproofing cover 50 to the seating part 13 may be more easily conducted.

In addition, a protrusion part (not illustrated) and a groove (not illustrated) corresponding to the protrusion part are formed in the position determining part 53 and the seating part 13, respectively, thereby making it possible to assist in alignment of the soundproofing cover 50 with the body 10 and maintenance of a state in which the soundproofing cover 50 is mounted on the body 10.

Figure 7:
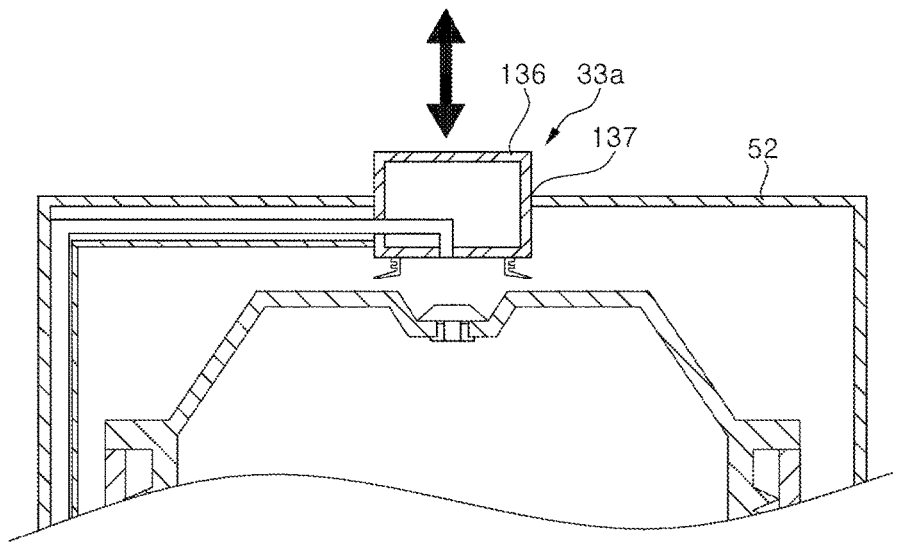
FIG. 7 is a schematic side cross-sectional view illustrating a movable contact part of a vacuum blender according to yet still another exemplary embodiment of the present invention.

Referring to FIG. 7, a schematic side cross-sectional view of an upper portion of a soundproofing cover according to yet still another exemplary embodiment of the present invention is illustrated.

The vacuum blender according to yet still another exemplary embodiment of the present invention illustrated in FIG. 7 is different from the vacuum blender according to an exemplary embodiment of the present invention illustrated in FIGS. 2 and 3 in that a contact part 33a is mounted to be vertically movable. For example, a hole is formed in the upper wall 52 of the soundproofing cover 50, and a contact body 136 may air-tightly vertically move in the hole. Therefore, a position of the contact body 136 is vertically adjusted depending on a height of the container 20, thereby making it possible to air-tightly connect the contact part 33a to the exhaust hole 24 of the container cover 21. Alternatively, air-tight connection may also be released, if necessary.

Alternatively, the contact body 136 may be configured to be fixed to a lower position when it is pushed downwardly once, and move upwardly to return to its initial position when it is pushed downwardly once more.

Figure 8:
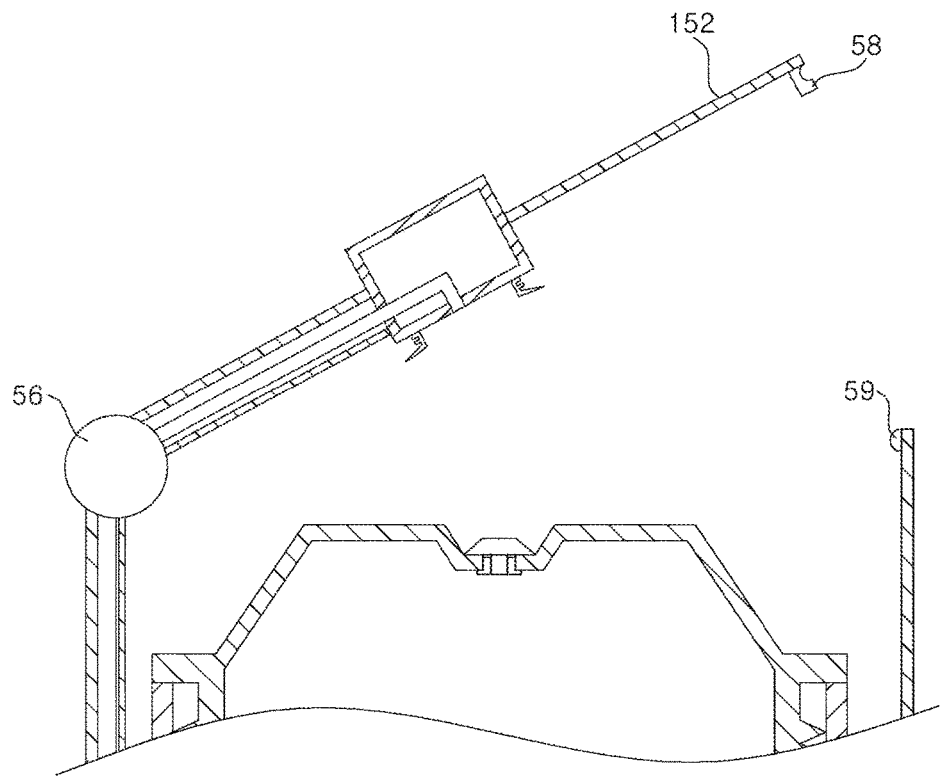
FIG. 8 is a schematic side cross-sectional view illustrating a movable contact part of a vacuum blender according to yet still another exemplary embodiment of the present invention.

Referring to FIG. 8, a schematic side cross-sectional view of an upper portion of a soundproofing cover according to yet still another exemplary embodiment of the present invention is illustrated.

The vacuum blender according to yet still another exemplary embodiment of the present invention illustrated in FIG. 8 is different from the vacuum blender according to an exemplary embodiment of the present invention illustrated in FIGS. 2 and 3 in that an upper wall 152 of the soundproofing cover 50 is formed of an opening or closing door. The opening or closing door 152 may be connected to an upper end of one side of the sidewall 54 of the soundproofing cover 50 through a hinge 56. In addition, in order to maintain a closed state of the opening or closing door 152, a hooking member 58 may be provided at the other end portion of the opening or closing door 152 opposite to the hinge 56, and a protrusion 59 onto which the hooking member 58 may be hooked may be provided at an upper end of the sidewall 54.

Figure 9:
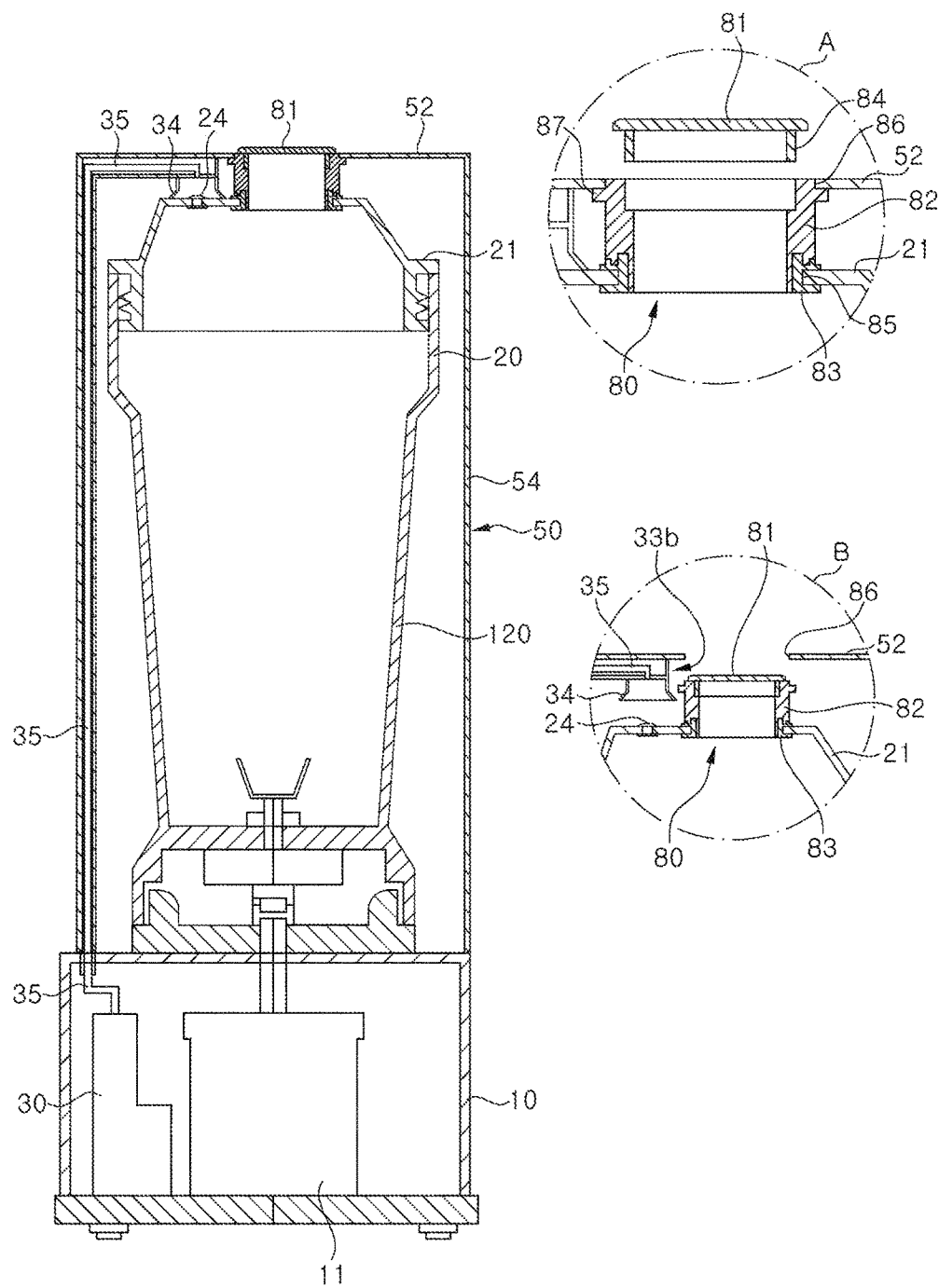
FIG. 9 is a schematic side cross-sectional view illustrating a vacuum blender according to yet still another exemplary embodiment of the present invention.

Referring to FIG. 9, a schematic side cross-sectional view of a blender according to yet still another exemplary embodiment of the present invention is illustrated.

The blender according to yet still another exemplary embodiment of the present invention illustrated in FIG. 9 is different from the vacuum blender according to an exemplary embodiment of the present invention illustrated in FIGS. 2 and 3 in that it further includes an auxiliary injection part that may permit a food or a material to be injected into the container 20 even in a state in which the soundproofing cover 50 is mounted on the body 10.

The auxiliary injection part 80 may include an extended part 82 extended upwardly from a hole 85 formed in the container cover 21 of the container 20; and an auxiliary lid 81 that may open or close an upper opening of the extended part 82. The extended part 82 may be connected to the hole 85 of the container cover 21 through a packing 83 in order to maintain air-tightness. An upper end of the extended part 82 may be closely adhered to an opening 86 formed in the upper wall 52 of the soundproofing cover 50 (see A of FIG. 9). In this case, an outer contact part 87 protruding outwardly may be formed on an outer surface of the extended part 82 in order to closely adhere and connect the extended part 82 and the upper wall 52 to each other.

Even though the soundproofing cover 50 is separated from the body 10, the auxiliary lid 81 of the auxiliary injection part 80 may remain in a state in which it closes the extended part 82 (see B of FIG. 9). The auxiliary lid 81 may include an insertion part 84 extended downwardly of the auxiliary lid 81 and closely adhered to an inner surface of the extended part 82 in order to air-tightly close the extended part 82. In addition, a step part corresponding to the insertion part 84 may be formed on the inner surface of the extended part 82 to further improve air-tightness between the auxiliary lid 81 and the extended part 82.

Meanwhile, the exhaust hole 24 may be disposed in the vicinity of the auxiliary injection part 80, and a position of an adsorption member 34, or the like, of a contact part 33*b* may be changed correspondingly.

Figure 10:
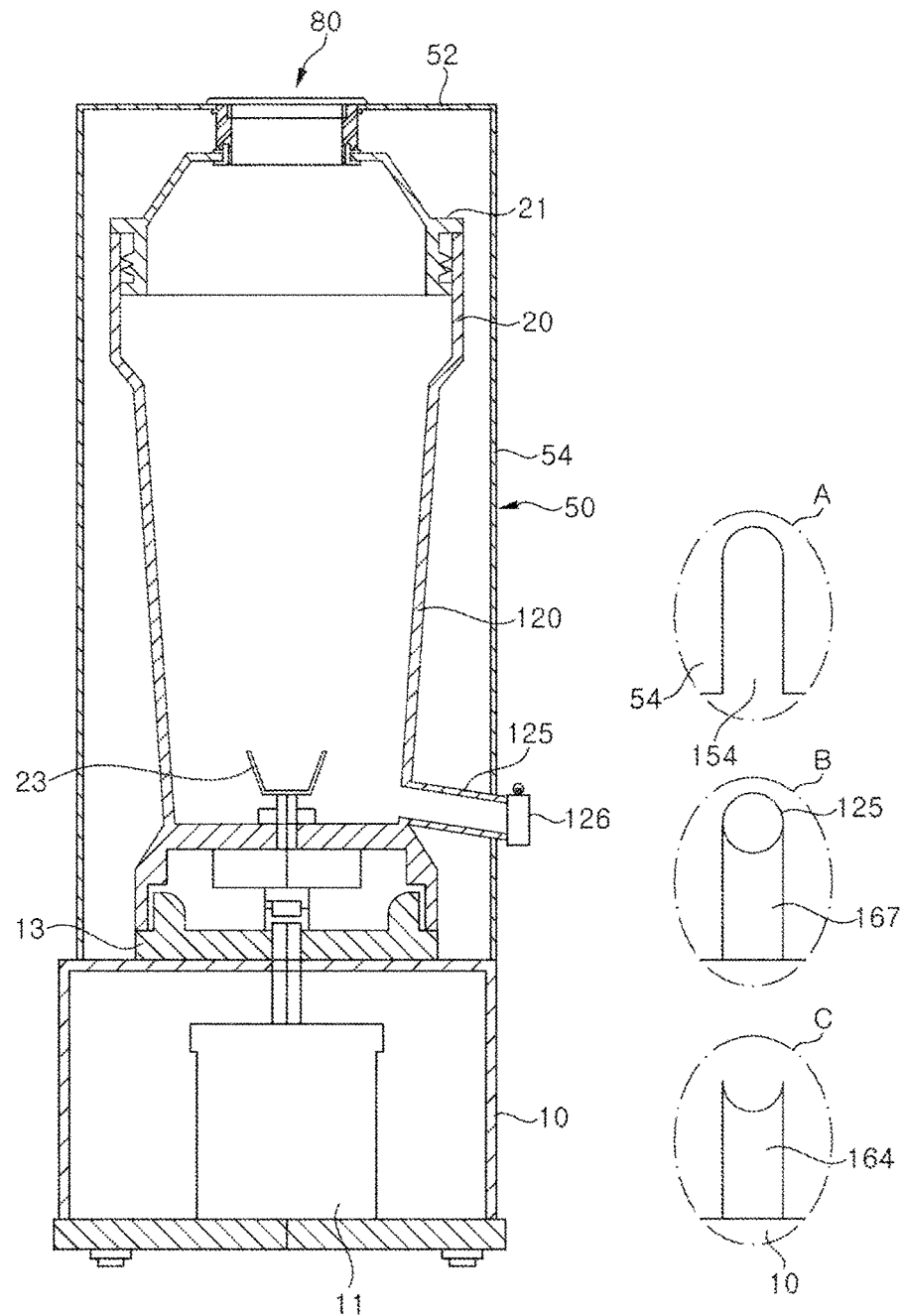
FIG. 10 is a schematic side cross-sectional view illustrating a blender according to yet still another exemplary embodiment of the present invention.

Referring to FIG. 10, a schematic side cross-sectional view of a blender according to yet still another exemplary embodiment of the present invention is illustrated.

The blender according to yet still another exemplary embodiment of the present invention illustrated in FIG. 10 is different from the vacuum blender according to an exemplary embodiment of the present invention illustrated in FIGS. 2 and 3 in that a discharging part 125 that may permit a food in the container 120 to be discharged to the outside is formed in the sidewall of the container 120.

The discharging part 125 may be formed at a lower portion of the sidewall of the container 120, and a valve 126 for opening or closing the discharging part 125 may be mounted at a free end portion of the discharging part 125.

In addition, the discharging part 125 protrudes to have a length enough to be exposed to the outside of the soundproofing cover 50.

A cutout part 154 (see A of FIG. 10) may be formed at a lower portion of the soundproofing cover 50 so that the free end portion of the discharging part 125 may be exposed to the outside of the soundproofing cover 50 in a state in which the soundproofing cover 50 is mounted on the body 10. For example, the cutout part 154 is formed upwardly from the lower end of the soundproofing cover 50 in a length direction, such that the discharging part 125 may be inserted into the cutout part 154 when the soundproofing cover 50 is mounted on the body 10.

When the soundproofing cover 50 is completely mounted on the body 10, an outer surface of the discharging part 125 and an upper end portion of the cutout part 154 may be closely adhered to each other so that shapes thereof are matched to each other, and the other opened cutout part 154 may be closed by, for example, a closing part 167 extended downwardly from a lower side of the discharging part 125 (see B of FIG. 10), or be closed by a closing part 164 extended upwardly from an upper portion of the body 10 (see C of FIG. 10). In this case, a concave part formed at an upper end of the closing part 164 and an outer surface of a lower side of the discharging part 125 may be closely adhered to each other so that shapes thereof are matched to each other.

In addition, although the component described above or a component to be described below that may exhaust air in the container 120 or the soundproofing cover 50, such as the vacuum pump 30, or the like, is not illustrated in FIG. 10, the blender according to yet still another exemplary embodiment of the present invention illustrated in FIG. 10 may also have such a component.

Figure 11:
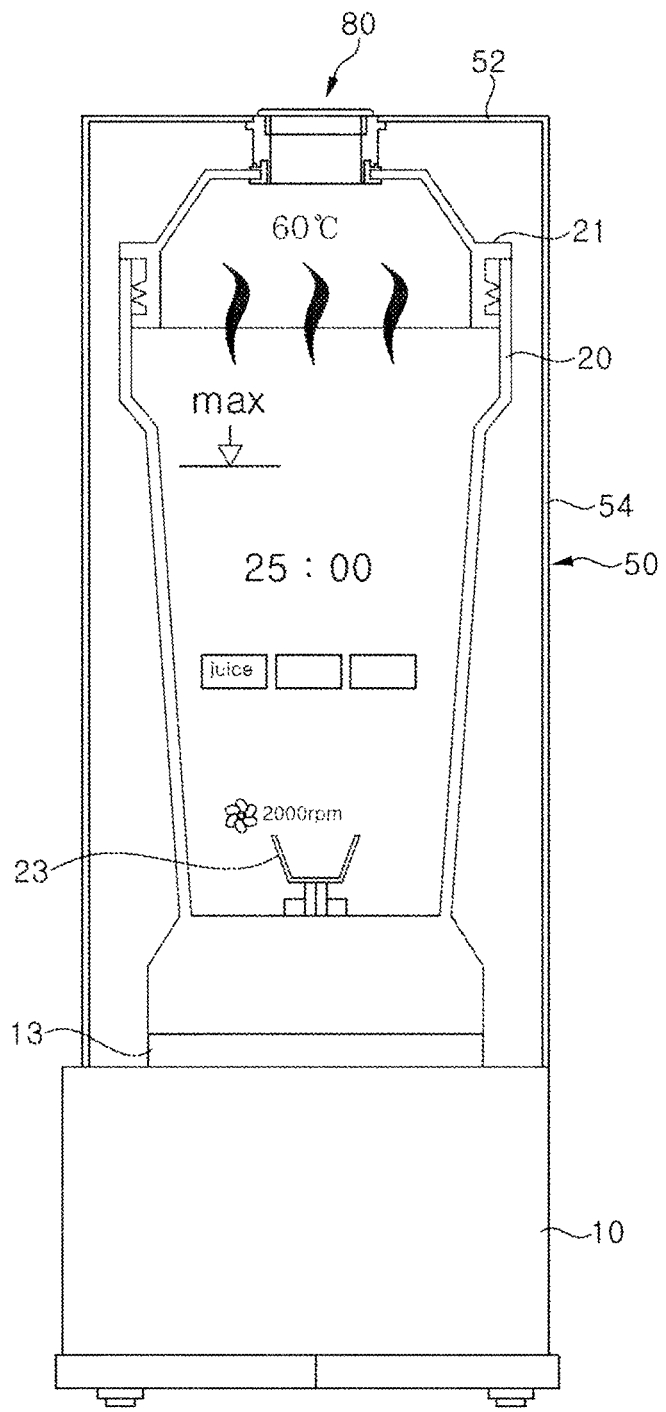
FIG. 11 is a schematic side view illustrating a blender according to yet still another exemplary embodiment of the present invention.

Referring to FIG. 11, a schematic side view of a blender according to yet still another exemplary embodiment of the present invention is illustrated.

The blender according to yet still another exemplary embodiment of the present invention illustrated in FIG. 11 is different from the blender according to the exemplary embodiment of the present invention described above in that it includes a display such as a transparent display provided in the soundproofing cover 50.

The transparent display may display information related to an operation state of the blender, for example, revolutions per minute (RPM) of the motor 11, a kind of content contained in the container 20, an operation time of the motor input by the user or a time elapsing after the motor is operated, a maximum height of the content contained in the container 20, a temperature of the content, vapor marks of which the number is increased in proportion to a temperature, a degree of vacuum in the container 20, and the like, as illustrated in FIG. 11. In addition, they may also be displayed by augmented reality.

In addition, the component described above or a component to be described below that may exhaust air in the container 120 or the soundproofing cover 50, such as the vacuum pump 30 illustrated in FIG. 9 may also be disposed in the blender according to yet still another exemplary embodiment of the present invention illustrated in FIG. 11, as in the blender according to yet still another exemplary embodiment of the present invention illustrated in FIG. 10.

Figure 12:
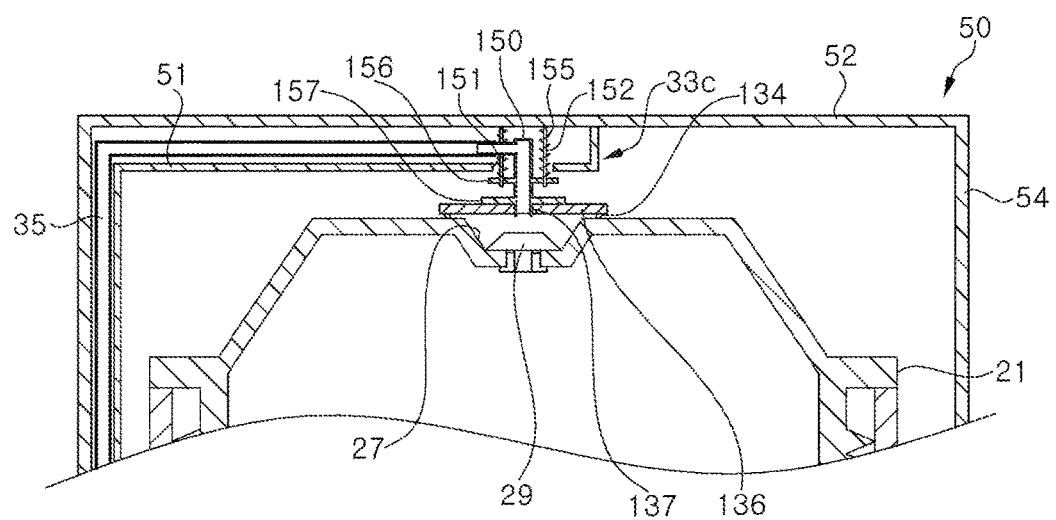
FIG. 12 is a schematic partial side cross-sectional view illustrating a blender according to yet still another exemplary embodiment of the present invention.

Referring to FIG. 12, a partial side cross-sectional view of a blender according to yet still another exemplary embodiment of the present invention is illustrated.

The blender according to yet still another exemplary embodiment of the present invention illustrated in FIG. 12 is different from the vacuum blender according to an exemplary embodiment of the present invention illustrated in FIGS. 2 and 3 in that a contact part 33*c* may vertically move below the upper wall 52. The contact part 33*c* includes a compressing plate 136*a* air-tightly closely adhered to a circumferential part of the concave part 27 of the container cover 21, a connection nozzle 150 fixedly connected to a through-hole 137 of the compressing plate 136*a*, a support bar 152 having one end slidably connected to a hole of a first flange 156 extended in a lateral direction of the connection nozzle 150 and the other end fixedly connected to the upper wall 52, and an elastic member 155 inserted onto an outer surface of the support bar 152 to press the first flange 156 downwardly.

In addition, a second flange 157 extended in a lateral direction is formed in a portion of the connection nozzle 150 in which the compressing plate 136*a* and the connection nozzle 150 are connected to each other, so as to be fixed to the connection nozzle 150, such that connection between the compressing plate 136*a* and the connection nozzle 150 may become firm.

A sealing member 134 such as an O-ring for improving air-tightness may be provided on a lower surface of the compressing plate 136*a*, that is, a surface of the compressing plate 136 closely adhered to the container cover 21.

Both end portions of the elastic member 155 may be fixedly connected to the upper wall 52 and the first flange 156, respectively, to prevent the connection nozzle 150 from dropping downwardly.

The connection nozzle 150 may have a shape in which it is bent at an angle of approximately 90 degrees, and has one end portion connected to the vacuum tube 35 and the other end portion connected to the compressing plate 136*a*. The connection nozzle 150 may be extended downwardly through an opening 151 of the inner wall 51.

According to the configuration as described above, when the soundproofing cover 50 is mounted on the body 10 so as to cover the container 21, the compressing plate 136*a* of the contact part 33*c* may be closely adhered to the circumferential portion of the concave part 27 of the container cover 21. In this case, the compressing plate 136*a* may be pressed upwardly by a predetermined level by the container cover 21, and the elastic member 155 is compressed by the movement of the compressing plate 136*a* as described above, such that elastic force of the elastic member 155 acts in a direction in which the elastic member 155 is expanded, thereby making it possible to improve a close adhesion property between the compressing plate 136*a* and the container cover 21.

Figure 13:
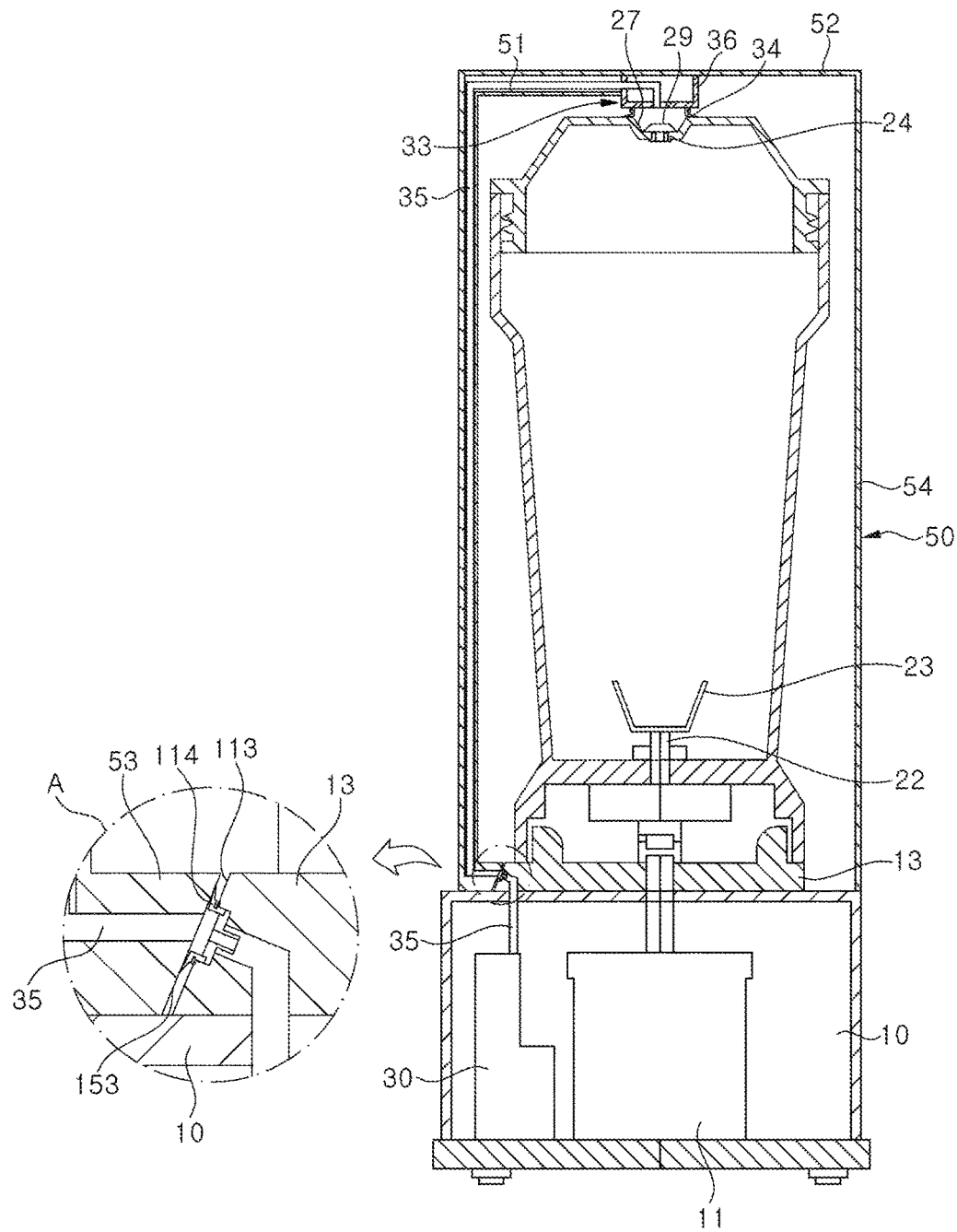
FIG. 13 is a schematic side cross-sectional view illustrating a blender according to yet still another exemplary embodiment of the present invention.

Referring to FIG. 13, a schematic side cross-sectional view of a blender according to yet still another exemplary embodiment of the present invention is illustrated.

The blender according to yet still another exemplary embodiment of the present invention illustrated in FIG. 13 is different from the vacuum blender according to yet still another exemplary embodiment of the present invention illustrated in FIG. 6 in that one end portion 31 of the vacuum tube (the first vacuum tube (or channel)) 35 extended from the vacuum pump 30 is exposed in the seating part 13, for example, the second inclined surface 113 formed at an edge, and one end portion 32 of the vacuum tube (the second vacuum tube (or channel)) 35 connected to one end portion 31 and exposed in a lower end portion of the soundproofing cover 50 is exposed in the position determining part 53, for example, the first inclined surface 153.

As illustrated in an enlarged view in circle A of FIG. 13, an adsorption member 114 may be provided at one end portion of the vacuum tube 35 extended from the vacuum pump 30. The adsorption member 114 may be closely adhered to the first inclined surface 153 of the position determining part 53 in which one end portion of the vacuum tube 35 is exposed when the soundproofing cover 50 is mounted on the body 10, and may be more air-tightly closely adhered to the first inclined surface 153 when suction force is generated in the adsorption member 114 due to an operation of the vacuum pump 30.

Figure 14:
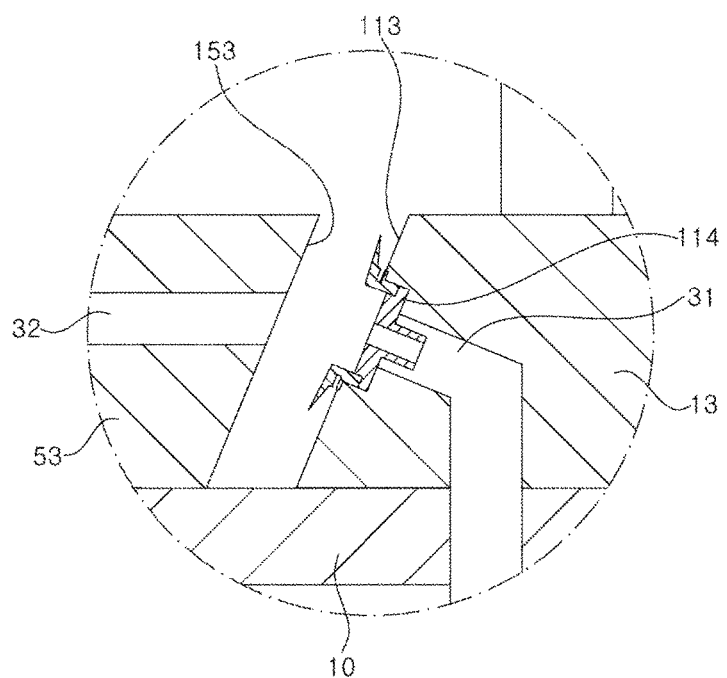
FIG. 14 is a partial side cross-sectional view illustrating the blender of FIG. 13.

In addition, when the soundproofing cover 50 is detached from the body 10, the adsorption member 114 and the position determining part 53 may be spaced apart from each other, as illustrated in FIG. 14.

Figure 15:
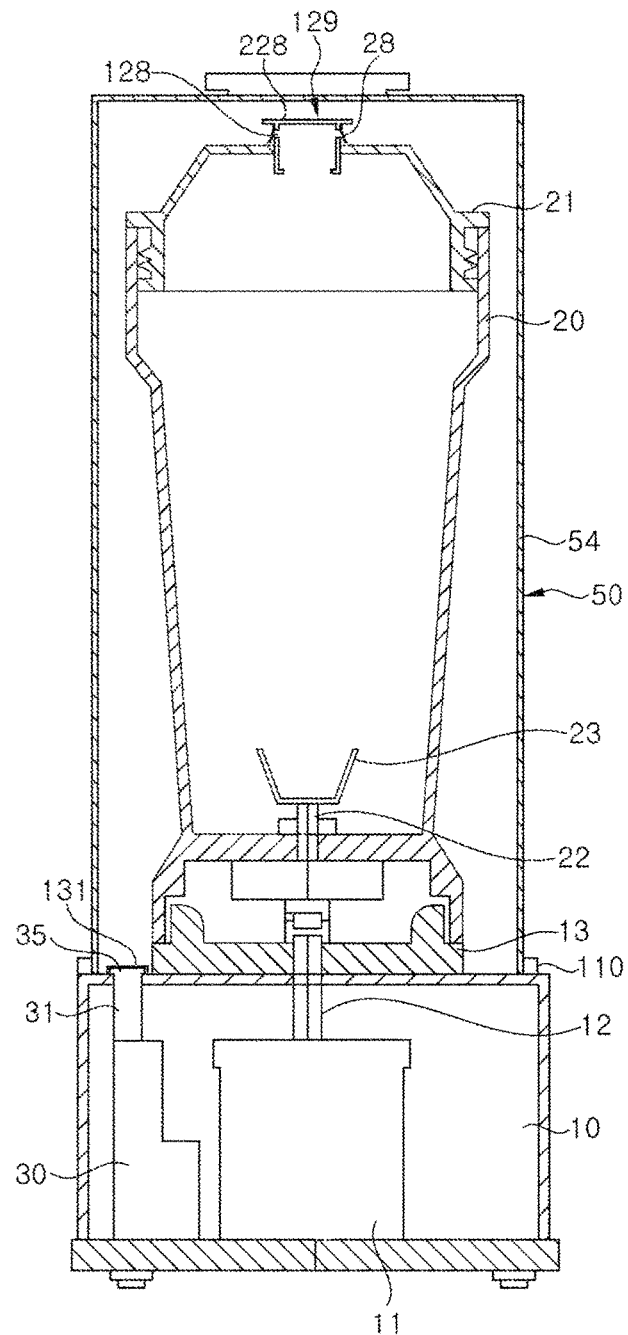
FIG. 15 is a schematic side cross-sectional view illustrating a blender according to yet still another exemplary embodiment of the present invention.

Referring to FIG. 15, a schematic side cross-sectional view of a blender according to yet still another exemplary embodiment of the present invention is illustrated.

The blender according to yet still another exemplary embodiment of the present invention illustrated in FIG. 15 is different from the vacuum blender according to an exemplary embodiment of the present invention illustrated in FIGS. 2 and 3 in that one end portion of the vacuum pump (the first vacuum tube (or channel)) 35 that is in communication with the suction port of the vacuum pump 30 is disposed to be exposed in a portion forming a space closed by the soundproofing cover 50 and the body 10 when the soundproofing cover 50 is mounted on the body 10, on the upper surface of the body 10.

In addition, a check valve 129 that may permit air in the container 20 to be exhausted and may block air from being introduced is provided in the container cover 21. However, the check valve 129 is not limited thereto, but may be provided at a portion of the container 20.

The check valve 129 includes a body 228 having a hollow pillar shape having an upper side that is closed and having an opening formed in a bottom thereof, an exhaust hole 128 formed in a sidewall of the body 228 and positioned outside the container cover 21, and an exhaust hole cover 28 disposed on the sidewall of the body 228 so as to close the exhaust hole 128.

The exhaust hole cover 28 may be formed of, for example, a membrane, and be lifted to allow the exhaust hole 128 to be opened when air in the soundproofing cover 50 is exhausted through the vacuum tube 35 by the vacuum pump 30. Therefore, the air in the container 20 may flow into the soundproofing cover 50, and may be exhausted to the outside of the soundproofing cover through the vacuum tube 35.

In addition, a filter member 131 that may filter dust in the air or foreign materials may also be attached to one end portion of the vacuum tube 35 connected to the inlet port of the vacuum pump 30.

In addition, a compressing member 110 closely adhered to the lower end portion of the soundproofing cover 50 when the soundproofing cover 50 is mounted on the body 10 may be provided on the upper surface of the body 10. Air-tightness between the lower end of the soundproofing cover 50 and the body 10 may be improved by the compressing member 110. The compressing member 110 may be formed of an elastic material, and may be formed along an edge of the lower end of the soundproofing cover 50.

According to the configuration as described above, since the air in the container 20 and the air in the soundproofing cover 50 may be exhausted by a simple configuration, noise generated during a period in which the blender is used, for example, noise due to friction between the mixer blade 23 and the food, noise generated in the driving force transfer mechanism transferring the driving force of the motor 11 to the mixer blade 23, and the like, may be effectively decreased.

It may be easily understood by those skilled in the art that various exemplary embodiments described hereinabove are not necessarily operated as only one exemplary embodiment, but may also configure other exemplary embodiments by various combinations of feature portions of the respective exemplary embodiments.

Various exemplary embodiments of the present invention have been described hereinabove, and as described above, according to the present invention, the soundproofing cover is mounted on the body, thereby making it possible to air-tightly cover the container and the driving force transfer mechanism, and the air in the soundproofing cover or the container may be exhausted, thereby making it possible to effectively block the noise generated in the container or in the vicinity of the seating part of the body.

In addition, since the soundproofing cover may be completely removed from the body, a protruding component is not formed on the body, such that a space in which the body may be received may be saved. Further, since it is possible to mount the container on the seating part of the body and observe the inner portion of the container even at any place of the entire circumference of the body, convenience of the use may be significantly improved.

In addition, the exemplary embodiments described above are provided to illustratively describe the present invention, and the present invention is not limited thereto. Modifications and alterations for these exemplary embodiments may be easily made by those skilled in the art, and it is to be noted that these modifications and alterations fall within the scope of the present invention as defined in the claims.

What is claimed is:

1. A blender comprising:
   a body including a motor for providing driving force and a vacuum pump for sucking air;
   a container detachably mounted on the body and including a processing member rotatably mounted at an inner portion of a lower side thereof and a container cover air-tightly mounted in an upper opening thereof;
   a first vacuum tube connected to the vacuum pump;
   a soundproofing cover mounted on the body so as to cover the container, detachable from the body to be completely separated from the body, and having an internal space closed by closure of an opening of one end thereof by the body when the soundproofing cover is mounted on the body; and a second vacuum tube provided in the soundproofing cover so as to be extended from a lower end of a sidewall of the soundproofing cover to a contact part of an upper wall of the soundproofing cover.

2. The blender of claim 1, wherein an exhaust hole allowing an inner portion of the container and the internal space of the soundproofing cover to be in communication with each other is formed in the container cover.

3. The blender of claim 2, wherein when the soundproofing cover is mounted on the body, the second vacuum tube is connected to the first vacuum tube and the contact part contacts the exhaust hole.

4. The blender of claim 1, wherein an inner sidewall dualizing a portion of the sidewall is formed on the sidewall.

5. The blender of claim 4, wherein at least a portion of the second vacuum tube is disposed in the portion of the sidewall dualized by the inner sidewall.

* * * * *